(12) United States Patent
Johnson

(10) Patent No.: US 7,334,425 B1
(45) Date of Patent: Feb. 26, 2008

(54) ROTATIVE TRI-MODULE REFRIGERATION UNIT

(76) Inventor: Emed Johnson, 416 E. 154th St., 2nd Floor, Bronx, NY (US) 10455

(*) Notice: Subject to any disclaimer, the term of this patent is extended or adjusted under 35 U.S.C. 154(b) by 203 days.

(21) Appl. No.: 10/984,470

(22) Filed: Nov. 8, 2004

(51) Int. Cl.
F25D 11/00 (2006.01)

(52) U.S. Cl. .......................... 62/440; 62/441

(58) Field of Classification Search .............. 62/440, 62/441, 389, 382, 381; 312/401, 402, 414
See application file for complete search history.

(56) References Cited

U.S. PATENT DOCUMENTS

| | | | |
|---|---|---|---|
| 678,612 | A | 7/1901 | Daemicke |
| 986,875 | A | 3/1911 | Tilghman |
| 1,462,285 | A | 7/1923 | Hilger |
| 1,883,961 | A | 10/1932 | Kosmerl |
| 2,498,028 | A | 2/1950 | Clerc |
| 2,507,834 | A * | 5/1950 | Storer et al. ............... 62/229 |
| 2,811,020 | A * | 10/1957 | Formoso ..................... 62/297 |
| 3,365,907 | A | 1/1968 | Barroero |
| 4,123,130 | A | 10/1978 | Locke |
| 5,277,488 | A | 1/1994 | Cleary et al. |
| 5,584,189 | A * | 12/1996 | Bustos ........................ 62/255 |
| 6,073,460 | A | 6/2000 | Credle, Jr. et al. |
| 6,758,053 | B2 * | 7/2004 | Kim et al. ................... 62/198 |
| 2004/0118141 | A1 * | 6/2004 | Kim et al. ................... 62/258 |
| 2004/0177641 | A1 * | 9/2004 | Kim ............................ 62/441 |
| 2005/0016202 | A1 * | 1/2005 | Ko et al. ..................... 62/441 |
| 2006/0144053 | A1 * | 7/2006 | Zhang et al. ................ 62/6 |
| 2006/0144058 | A1 * | 7/2006 | Kentner et al. ............. 62/129 |

FOREIGN PATENT DOCUMENTS

| | | |
|---|---|---|
| CA | 1.053.734 | 5/1979 |
| DE | 4.311.829 | 10/1994 |

* cited by examiner

Primary Examiner—Melvin Jones
(74) Attorney, Agent, or Firm—Michael I Kroll

(57) ABSTRACT

A rotative refrigeration unit having three separate modules, each having an exteriorly positioned door 12, mounted on a base 56. The freezer module 16 has a compressor 52 that is used to regulate the freezer temperature with the satellite refrigeration modules 14 having vents 40 in communication with the freezer interior whereby temperature sensors within the satellite refrigeration modules 14 regulate the exchange of air between the freezer and the satellites and thereby maintain a user designated temperature within the satellite modules. Each of the door modules has a base engaging member whereby unit rotation is prohibited when a door 12 is open. Circumferentially positioned along the rim are a plurality of lights 22 serving as night lights that are illuminated when the doors 12 are closed and extinguished when the doors are opened.

6 Claims, 8 Drawing Sheets

ROTATIVE TRI-MODULE REFRIGERATION UNIT

BACKGROUND OF THE INVENTION

1. Field of the Invention

The present invention relates generally to refrigerators and, more specifically, to a rotative refrigeration unit having three separate modules, each having an exteriorly positioned door, mounted on a base. The freezer module has a compressor that is used to regulate the freezer temperature with the satellite modules having vents in communication with the freezer interior whereby temperature sensors within the satellite modules regulate the exchange of air between the freezer and the satellites and thereby maintain a user designated temperature within the satellite modules.

Each of the door modules has a base engaging member whereby unit rotation is prohibited when a door is open. Circumferentially positioned along the rim are a plurality of lights serving as night lights that are illuminated when the door are closed and extinguished when the doors are opened. The satellite modules have their own complement of drawers and shelves with one having a water filter in communication with a reservoir of filtered water.

2. Description of the Prior Art

There are other rotative devices designed for refrigeration. Typical of these is U.S. Pat. No. 678,612 issued to Daemicke on Jul. 16, 1901.

Another patent was issued to Tilghman on Mar. 14, 1911 as U.S. Pat. No. 986,875. Yet another U.S. Pat. No. 1,462,285 was issued to Hilger on Jul. 17, 1923 and still yet another was issued on Oct. 25, 1932 to Kosmerl as U.S. Pat. No. 1,883,961.

Another patent was issued to Clerc on Feb. 21, 1950 as U.S. Pat. No. 2,498,028. Yet another U.S. Pat. No. 3,365,907 was issued to Barroero on Jan. 30, 1968. Another was issued to Locke on Oct. 31, 1978 as U.S. Pat. No. 4,123,130 and still yet another was issued on Jan. 11, 1994 to Cleary, et al. as U.S. Pat. No. 5,277,488.

Another patent was issued to Bustos on Dec. 17, 1996 as U.S. Pat. No. 5,584,189. Yet another U.S. Pat. No. 6,073,460 was issued to Credle, Jr., et al. on Jun. 13, 2000. Another was issued to Locke on May 1, 1979 as Canadian Patent No. CA1053734 and still yet another was issued on Oct. 20, 1994 to Dipling, et al. as German Patent No. DE4311829.

U.S. Pat. No. 678,612

Inventor: Paul J. Daemicke

Issued: Jul. 16, 1901

A refrigerator, consisting of a revoluble cabinet comprising ice and storage chambers, and a receptacle for water of liquefaction, and a fixed base on which such cabinet is supported and revolved; the base having a water-pocket encompassing the axis, and the cabinet having an overflow drain-pipe from the water-receptacle having its receiving-mouth elevated above the bottom of the receptacle and its discharge-mouth overhanging the water-pocket in the base throughout the revolution of said cabinet.

U.S. Pat. No. 986,875

Inventor: Roswell L. Tilghman

Issued: Mar. 14, 1911

In a refrigerator o, the class described, an ice chamber having a floor provided with a centrally disposed opening and a plurality of openings surrounding the central opening, a display chamber below the ice chamber, a hollow shaft passing through said central opening and forming a vertical air circulation conduit connecting top and bottom of the refrigerator, and one or more perforated display selves carried by said shaft.

U.S. Pat. No. 1,462,285

Inventor: George Hilger

Issued: Jul. 17, 1923

A display apparatus comprising a casing, a central tubular column mounted for rotation on a vertical axis in said casing, means carried by said column for rotation therewith adapted to support products to be preserved, said column having a plurality of openings therein adjacent said supporting means, and means providing a refrigerating chamber in the upper portion of the casing having a central-opening in its bottom wall through which the upper open end of said column projects and having a coil therein with supply and return pipes depending through said column, said refrigerating chamber being arranged to communicate with the lower portion of the case at the sides thereof.

U.S. Pat. No. 1,883,961

Inventor: Josiph Kosmerl

Issued: Oct. 25, 1932

A refrigerator comprising a casing having a plurality of hinged doors; a base; means whereby said casing is rotatably mounted on said base; a refrigerating unit in said casing; a cooling unit in said casing comprising means for circulating an evaporating refrigerant, and a compressor for compressing the refrigerant vapor and for circulating the same.

U.S. Pat. No. 2,498,028

Inventor: Leonard F. Clerc

Issued: Feb. 21, 1950

In a device of the character described including an outer shell, inner shells and insulated upper and lower compartments, each having a rotatable commodity supporting member therein, the combination of means for independently refrigerating said compartments, said means comprising a cold plate for each said compartment; and defining one wall thereof, said plates having passageways therein communicating with a refrigerating machine, there being means carried by said rotatable members for defrosting the walls of said compartments.

U.S. Pat. No. 3,365,907

Inventor: Louis F. Barroero

Issued: Jan. 30, 1968

Refrigerated shelf structure which comprises:
(a) a central duct defining a longitudinally extending interior passageway and a plurality of longitudinally extending exterior passageways;
(b) a plurality of vertically-spaced, horizontal shelves mounted to and disposed circumferentially about said central duct, said shelves having an upper perforated support surface, a lower perforated surface and a horizontally disposed divider between said upper and lower surfaces, to thereby define an upper and lower shelf cavity;
(c) said upper shelf cavities communicating with one of said exterior passageways;
(d) said lower shelf cavities communicating with another of said exterior passageways;
(e) means for withdrawing air from one of said exterior passageways;
(f) means for cooling said air; and
(g) means for forcing said cool air into another of said exterior passageways.

U.S. Pat. No. 4,123,130

Inventor: Lillian Locke

Issued: Oct. 31, 1978

This disclosure pertains to a refrigerator housing having at least two access doors hingably affixed thereto on adjacent vertical exterior surfaces. A plurality of rotatable shelves are disposed intermediate or adjacent to the door openings providing convenient access for articles of food stored on the rotatable shelves and on arcuately shaped shelves adjacent thereto. A drawer, slidably affixed to the housing, is located over the storage areas associated with the rotatable shelves. A freezer compartment, having a hinged door panel, is accessible in the uppermost regions of the housing.

U.S. Pat. No. 5,227,488

Inventor: Liam Cleary et al.

Issued: Jan. 11, 1994

A refrigerator or freezer of a storage refrigerator unit includes a central support shaft mounted within the refrigeration cabinet having support containers adjustably mounted along the support shaft. The shaft structure is rotatably mounted within the cabinet for access to various portions of each container.

U.S. Pat. No. 5,584,189

Inventor: Rafael T. Bustos

Issued: Dec. 17, 1996

A multisided refrigerated display cabinet preferably being hexagonal in cross section and at least one door for accessing the interior product compartment from one side. Rotatable or non-rotatable shelves are provided within the display compartment. Three alternating insulated walls each include a recessed air duct leading from a refrigeration unit within a base of the display cabinet upwardly into the product compartment and opening to the product compartment. Three lights are mounted within the walls of the cabinet at locations substantially equally space about the periphery of the product compartment. Each major outer surface of the display cabinet also includes an adjustable bumper pad for protecting that surface from the impact of shopping carts and the like.

U.S. Pat. No. 6,073,460

Inventor: William S. Credle, Jr., et al.

Issued: Jun. 13, 2000

A cooler has a housing with a plurality of rotatable shelves. The shelves can move from an interior portion of the housing to an exposed exterior portion adjacent a discharge port of the cooler. The cooler is doorless so that access and viewing of the products in the port are unobstructed. An interior storage area is provided in the cooler for replenishment of removed products. An escapement mechanism can automatically load products from the storage area to empty slots on the periphery of the rotating shelf. Efficient cooling of the products is obtained. The shelves of the cooler can be rotated at the same or different speeds and/or directions. This merchandising cooler will not blend in with its surrounding environment to thereby attract a consumer's attention.

Canadian Patent Number CA1053734

Inventor: Lillian Locke

Issued: May 1, 1979

This disclosure pertains to a refrigerator housing having at least two access doors hingably affixed thereto on adjacent vertical exterior surfaces. A plurality of rotatable shelves are disposed intermediate or adjacent to the door openings providing convenient access for articles of food stored on the rotatable shelves and on arcuately shaped shelves adjacent thereto. A drawer, slidably affixed to the housing, is located over the storage areas associated with the rotatable shelves. A freezer compartment, having a hinged door panel, is accessible in the uppermost regions of the housing.

German Patent Number DE4311829

Inventor: Guenther Eberhard Dipling, et al

Published: Oct. 20, 1994

The invention relates to refrigerators and/or freezers which are used in the household, in particular to those refrigerators and/or freezers which have been advertised as "eco appliances." In this connection, the invention proposes to adapt the outer shape of the refrigerator and/or freezer to a cylindrical basic body with a basic surface from circular to elliptical and oval and to use the inner wall and outer wall for main refrigerating components of the circuit process, namely evaporator and condenser. The advantage of the invention is the simplified construction which furthermore can be utilized very well for corner and niche construction. A further major advantage is the optimum design of the ratio of internal volume to heat incidence surface and, associated with this, a relatively low energy consumption.

While these refrigeration units may be suitable for the purposes for which they were designed, they would not be as suitable for the purposes of the present invention, as hereinafter described.

SUMMARY OF THE PRESENT INVENTION

The present invention discloses a rotative refrigeration unit having three separate modules, each having an exteriorly positioned door, mounted on a base. The freezer module has a compressor that is used to regulate the freezer temperature with the satellite refrigeration modules having vents in communication with the freezer interior whereby temperature sensors within the satellite refrigeration modules regulate the exchange of air between the freezer and the satellites and thereby maintain a user designated temperature within the satellite modules. Each of the door modules has a base engaging member whereby unit rotation is prohibited when a door is open. Circumferentially positioned along the rim are a plurality of lights serving as night lights that are illuminated when the doors are closed and extinguished when the doors are opened. The satellite modules have their own complement of drawers and shelves with one having a water filter in communication with a reservoir of filtered water.

A primary object of the present invention is to provide a rotative refrigeration unit having three refrigeration modules mounted to a base with each module having its own door.

Another object of the present invention is to provide said refrigeration unit with a freezer module and adjacent satellite modules.

Yet another object of the present invention is to provide a refrigeration unit wherein said satellite modules are cooled by vents in communication with the freezer module.

Still yet another object of the present invention is to provide each module with a door having a base engaging member that prevents rotation when a door is open.

Another object of the present invention is to provide said base with a plurality of lights serving as a night light that are extinguished when any of the doors are opened.

Yet another object of the present invention is to provide said satellite modules with a complement of drawers and shelves.

Still yet another object of the present invention is to provide a refrigeration unit wherein one of the satellite modules has incorporated therein a water filter and reservoir of filtered water.

Another object of the present invention is to provide a refrigeration unit wherein said modules form part of a centrally located plenum for the placement therein of module services.

Additional objects of the present invention will appear as the description proceeds.

The present invention overcomes the shortcomings of the prior art by providing a rotative refrigeration unit having three separate modules, each having an exteriorly positioned door, mounted on a base. The freezer module has a compressor that is used to regulate the freezer temperature with the satellite modules having conduit in communication with the freezer interior whereby temperature sensors within the satellite modules regulate the exchange of air between the freezer and the satellites and thereby maintain a user designated temperature within the satellite modules.

Each of the door modules has a base engaging member whereby unit rotation is prohibited when a door is open. Circumferentially positioned along the rim are a plurality of lights serving as night lights that are illuminated when the door are closed and extinguished when the doors are opened. The satellite modules have their own complement of drawers and shelves with one having a water filter in communication with a reservoir of filtered water.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
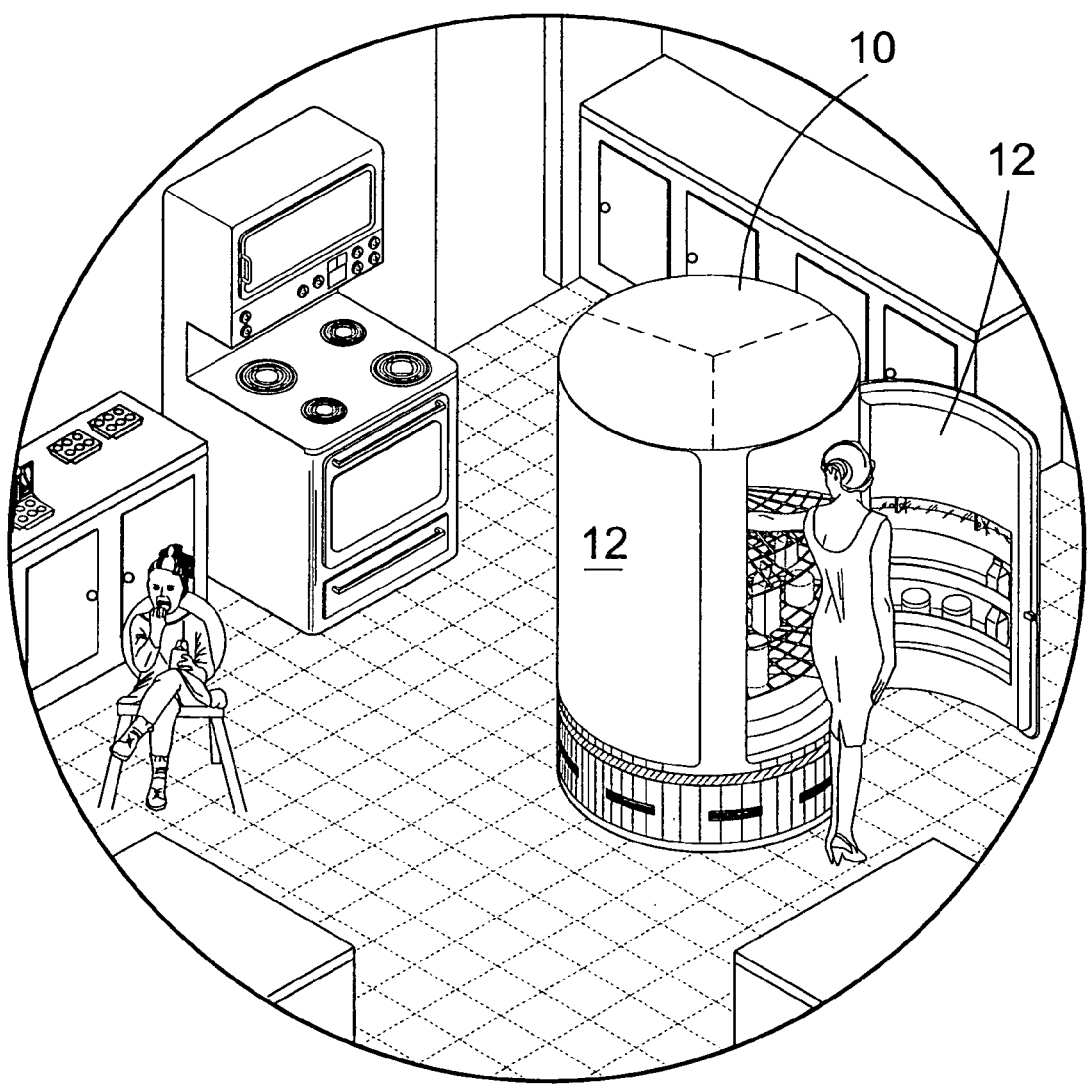
FIG. 1 is an illustrative view of the present invention in use.

With regard to reference numerals used, the following numbering is used throughout the drawings.

10 present invention
12 door
14 refrigerator
16 freezer
18 handle
20 arrow
22 night light
24 compressor compartment
26 vents
28 rotation plate
30 shelves
32 water filter
36 vegetable tray
38 central port
40 air intake fan
42 exhaust
44 lock/unlock member for rotation
46 thermostat
48 lock/unlock member to compressor
50 coils
52 compressor
54 water drip tray 56 base plate
58 bearings
60 coil line

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the present invention 10 in use. The present invention 10 discloses a refrigerator having a plurality of doors 12 and means for rotating the refrigerator to provide access to a selected door and having locking means for disengaging rotation when a door is open and control means for selectively varying the temperature within each section of the refrigerator and one of the doors incorporating a water filtration unit.

Figure 2:
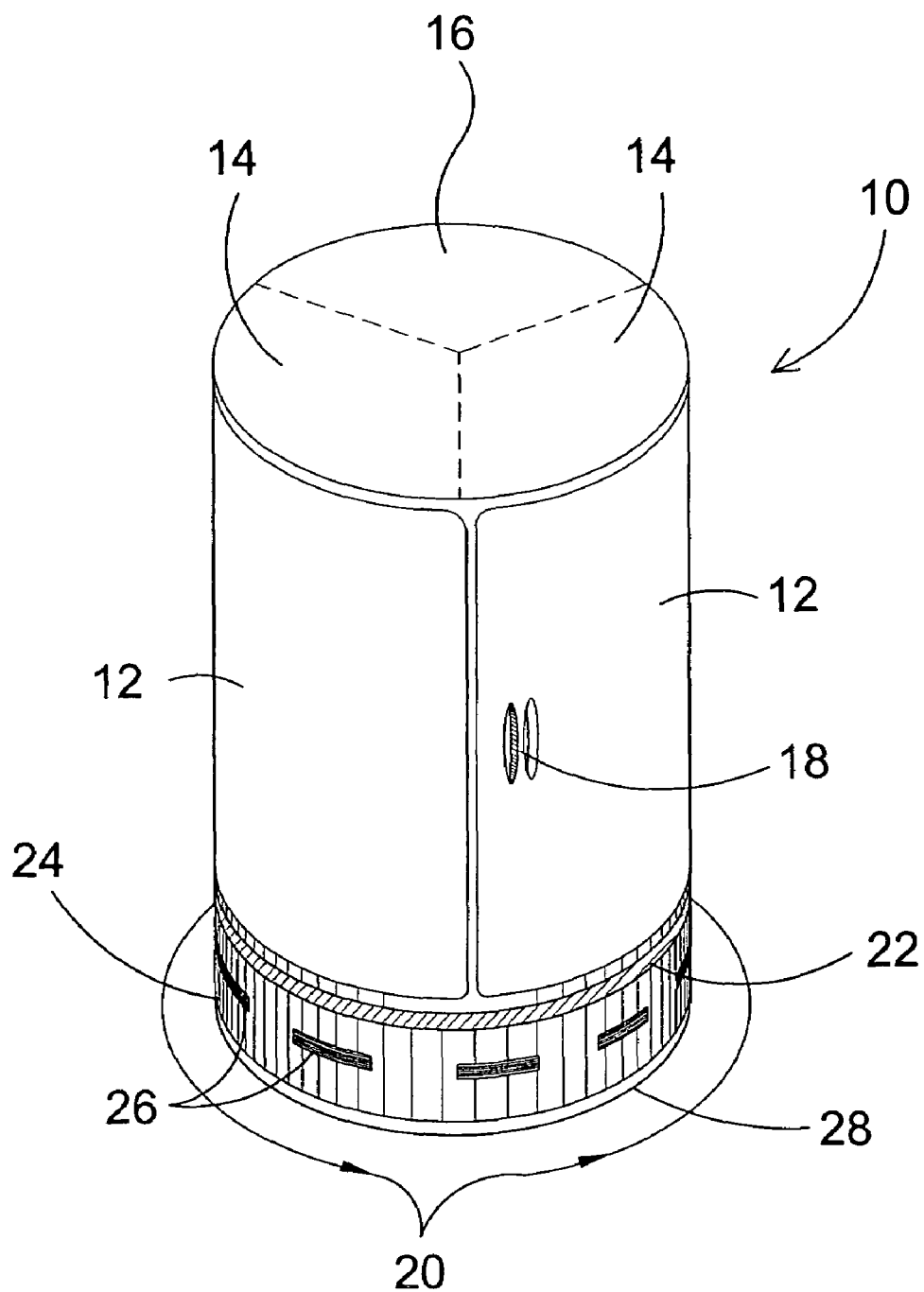
FIG. 2 is a perspective view of the present invention.

Turning to FIG. 2, shown therein is a perspective view of the present invention 10. The present invention 10 discloses a housing containing a plurality of compartments for a refrigerator 14 and freezer 16 having a plurality of doors 12 is designed to fit a large families needs. It can be placed in the center of the kitchen or in a corner. The refrigerator 14 of the present invention 10 is designed to rotate in a counter clockwise as shown at arrow 20 direction to choose which door 12 to use. When opening the door 12, the refrigerator 14 will lock itself as the user pulls on the handle 18 to open the door, it will stop the counter clockwise rotation at 20. The doors 12 provide shelves to hold the appropriate things that are needed. One of the refrigerator doors 12 can be opened fully to reach the motor in the bottom of the unit. A nightlight 22 or illuminating means surrounds the bottom of doors 12 and lights up when doors are closed and turns off when doors are open. Also shown are the refrigeration unit or compressor compartment 24, vents 26 and rotation plate 28.

Figure 3:
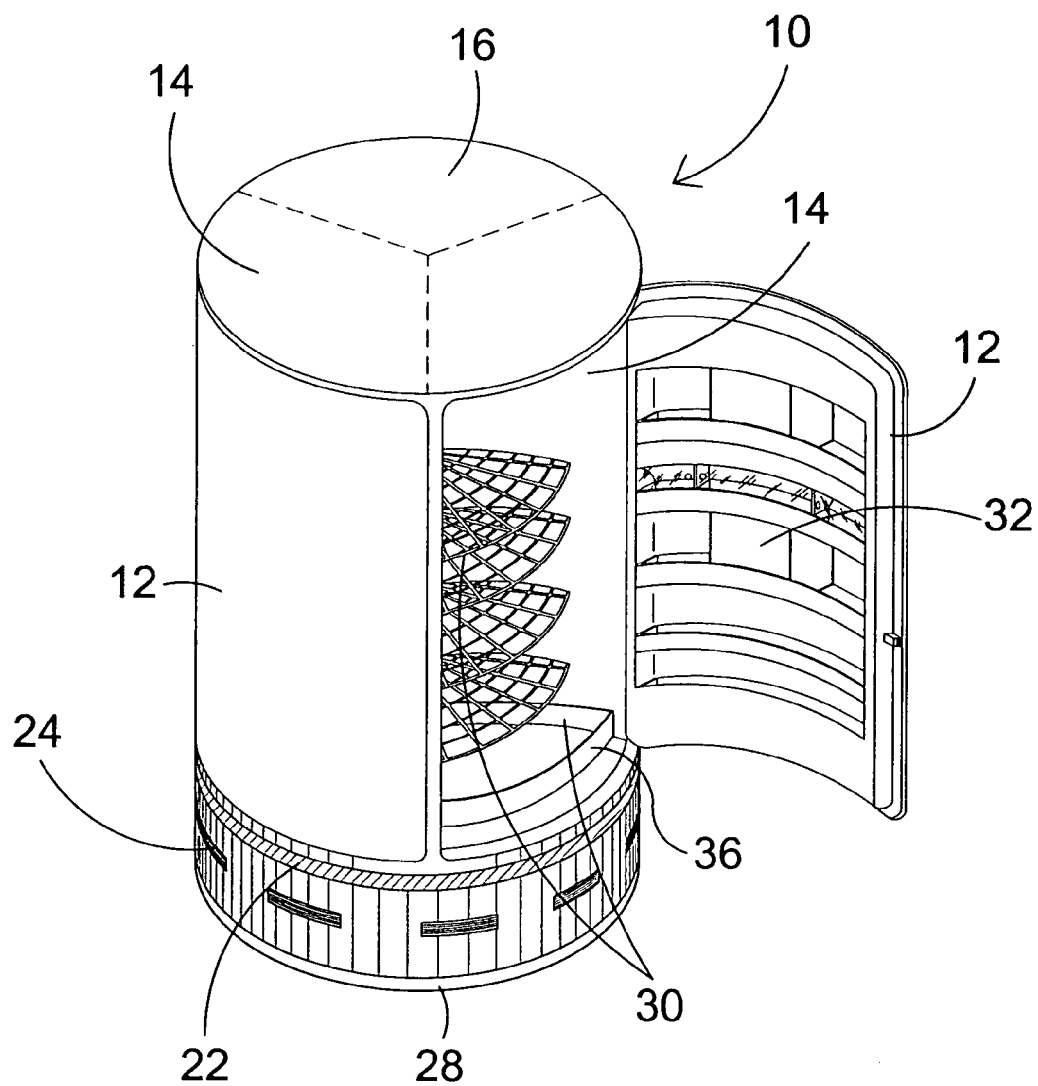
FIG. 3 is a perspective view of the present invention.

Turning to FIG. 3, shown therein is a perspective view of the present invention 10. The present invention 10 discloses a refrigerator 14 with freezer 16 having a plurality of doors 12 is designed to fit a large families needs. It can be placed in the center of the kitchen or in a corner. The refrigerator 14 of the present invention 10 is designed to rotate in a counter clockwise direction to choose which door 12 to use. When opening the door 12, the refrigerator 14 will lock itself as the user pulls open the door, and it will stop the counter clockwise rotation. The doors 12 provide access to shelves 30 to hold the appropriate things that are needed. One of the refrigerator doors 12 can be opened fully to reach the motor in the bottom of the unit. A nightlight 22 surrounds the bottom doors 12 and lights up when doors are closed and turns off when doors are open. Also shown are the water filtration unit 32, vegetable tray 36, compressor compartment 24 and rotation plate 28.

Figure 4:
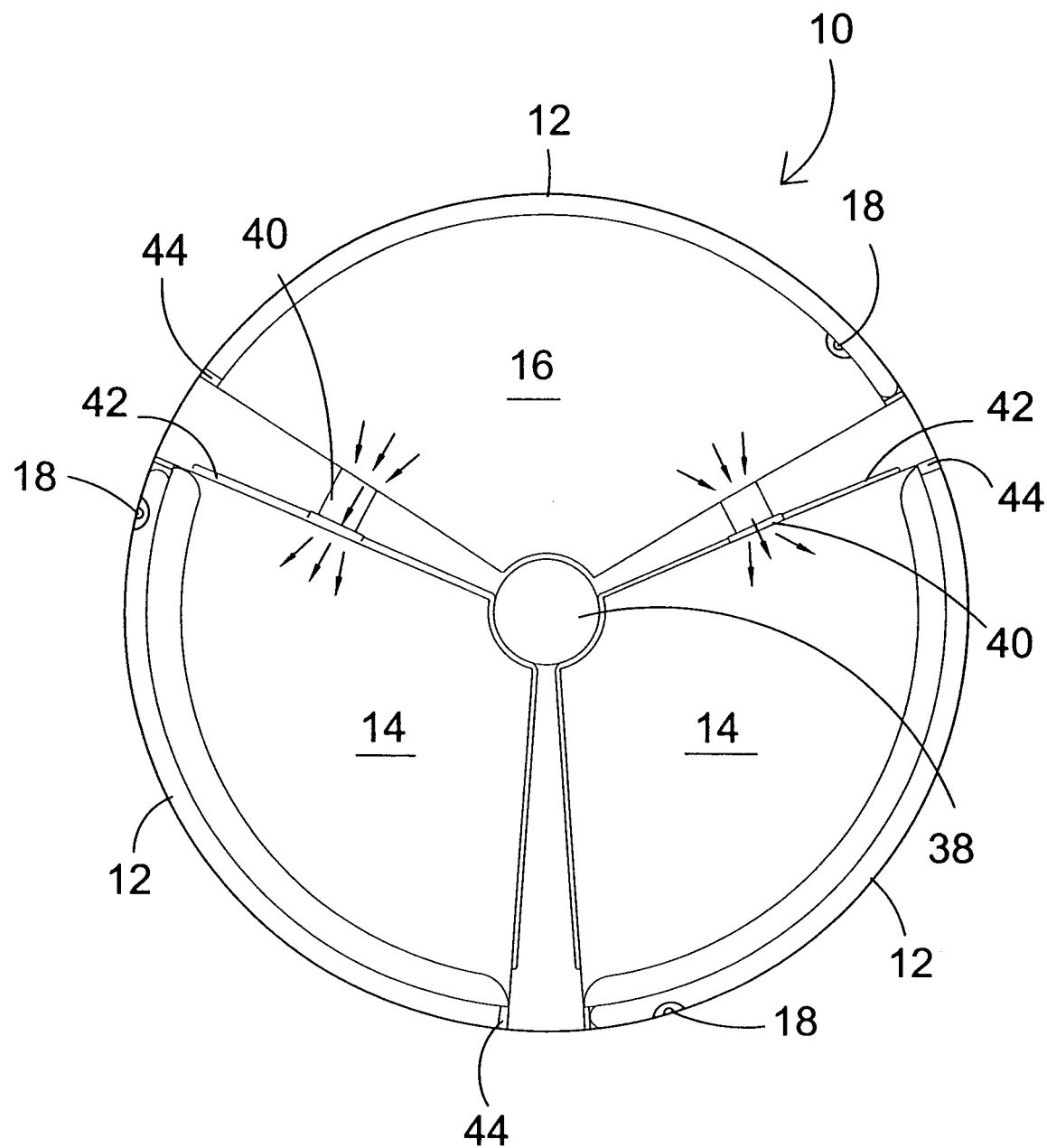
FIG. 4 is a top view locator of the present invention.

Turning to FIG. 4, shown therein is a top view locator of the present invention 10. The present invention 10 discloses a refrigerator freezer 14, 16 having a plurality of doors 12 is designed to fit a large families needs. It can be placed in the center of the kitchen or in a corner. The refrigerator of the present invention 10 is designed to rotate in a counter clockwise direction to choose which door 12 to use. When opening the door 12, the refrigerator 14 will lock itself as the user pulls on handle 18 to open the door, and it will stop the counter clockwise rotation. The doors 12 provide shelves to hold the appropriate things that are needed. One of the refrigerator doors 12 can be opened fully to reach the motor in the bottom of the unit. A nightlight surrounds the bottom doors and lights up when doors are closed and turns off when doors are open. Also shown are a central air distribution port 38, intake 40, exhaust 42, and lock/unlock 44 control for starting and stopping rotation.

Figure 5:
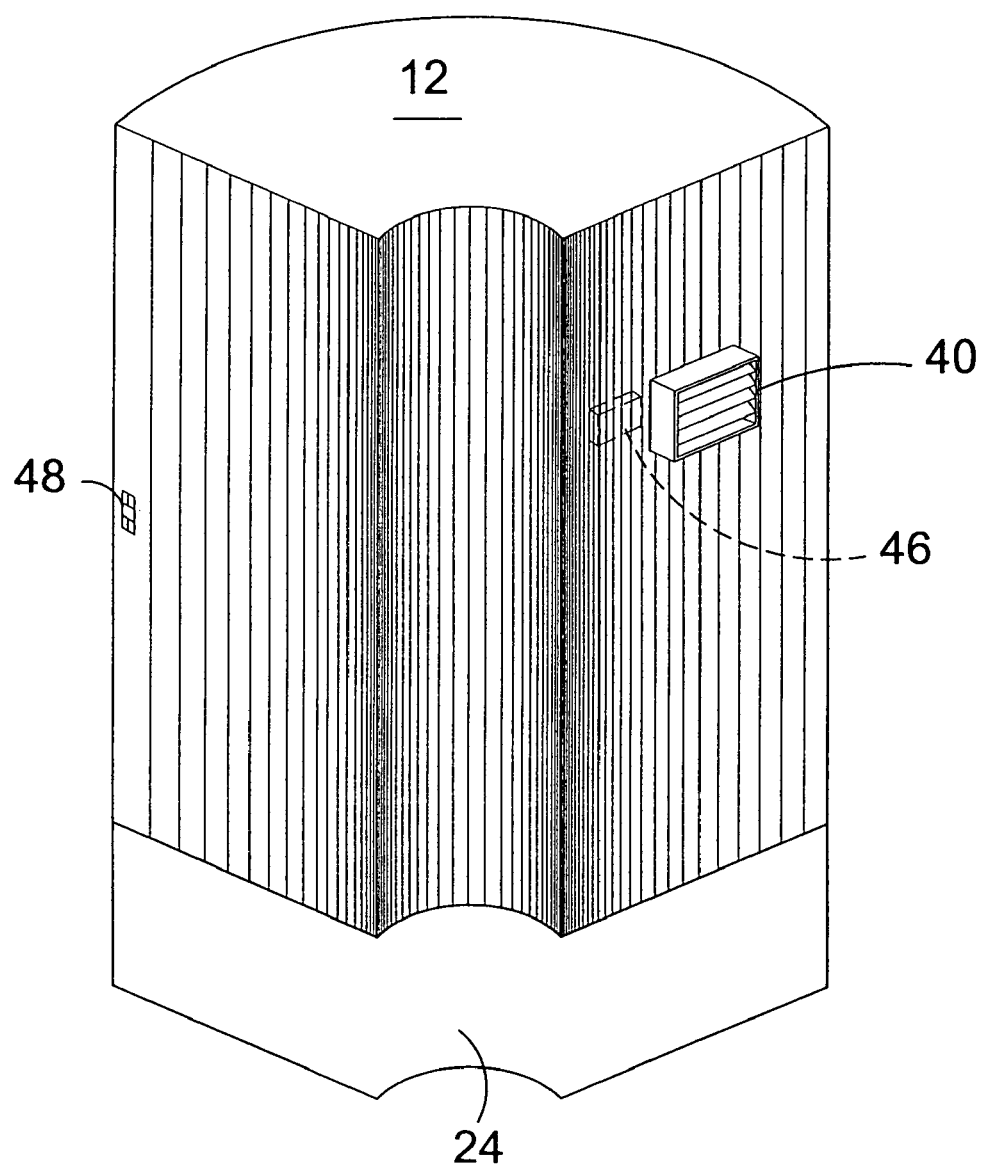
FIG. 5 is a detailed view of the inner wall of refrigerator door a of the present invention.

Turning to FIG. 5, shown therein is a detailed view of the inner wall of a first refrigerator door 12 of the present invention. Shown is the inner wall of the first refrigerator door 12. An intake fan 40 blows cold air from the freezer unit into the refrigerator unit to cool it. A thermostat 46 is located inside the refrigerator 12 to determine and maintain the temperature within. Also shown is the lock/unlock member 48 that opens the maintenance space to the compressor compartment 24.

Figure 6:
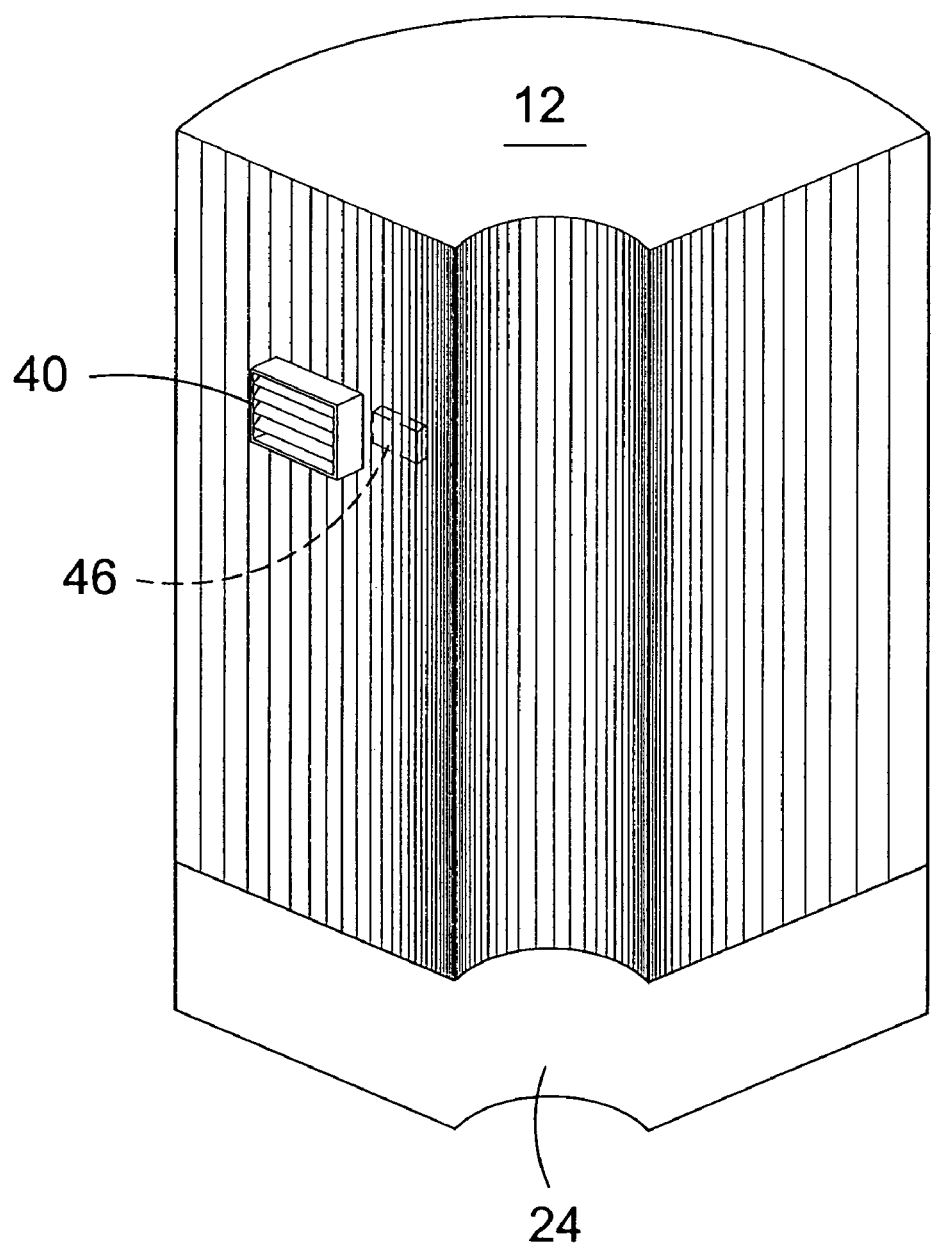
FIG. 6 is a detailed view of the inner wall of refrigerator door b of the present invention.

Turning to FIG. 6, shown therein is a detailed view of the inner wall of a second refrigerator door 12 of the present invention. Shown is the inner wall of the second refrigerator door 12. An intake fan 40 blows cold air from the freezer unit into the refrigerator unit 12 to cool it. A thermostat 46 is located inside the refrigerator 12 to determine and maintain the temperature within. One of the refrigerator doors will provide a water filtration unit. The compressor compartment 24 is also shown.

Figure 7:
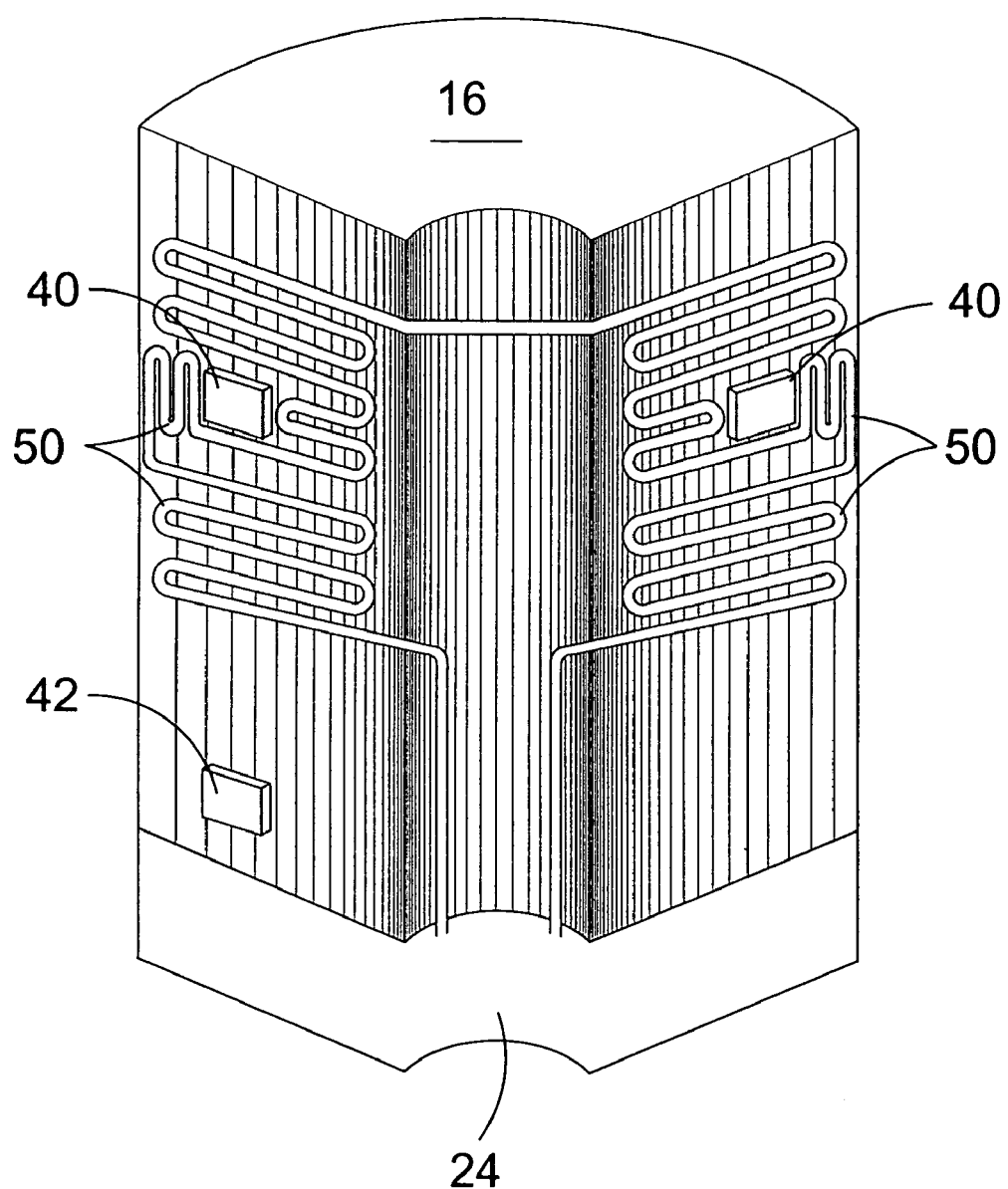
FIG. 7 is a detailed view of the inner wall of freezer door "C" of the present invention.

Turning to FIG. 7, shown therein is a detailed view of the inner wall of freezer 16 of the present invention. Shown is the inner wall of the freezer 16. The freezer 16 has coils 50 that run from the top to the bottom of the unit. A pair of fans 40 are located on both sides to blow cold air into the two refrigerator units, which are controlled by thermostats in both refrigerator units. The compressor compartment 24 is also shown.

Figure 8:
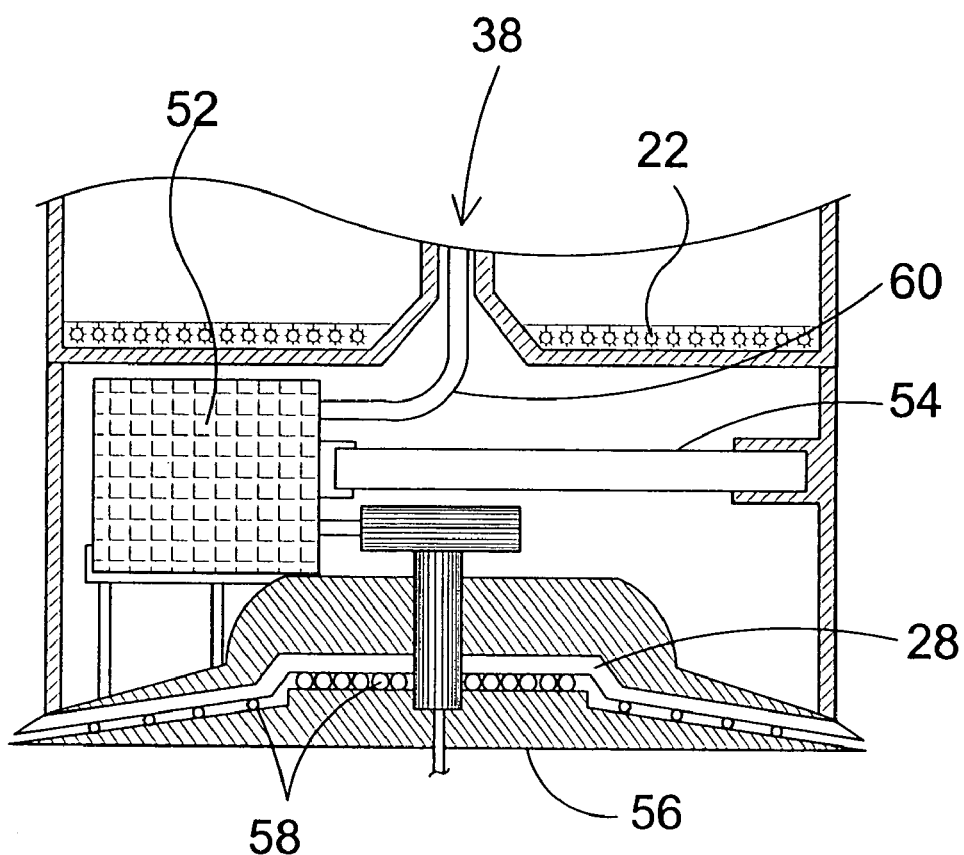
FIG. 8 is a partial sectional view of the present invention.

Turning to FIG. 8, shown therein is a partial sectional view of the present invention. Shown is a partial sectional view of the present invention disclosing a refrigerator having a plurality of doors and means for rotating the refrigerator to provide access to a selected door and having locking means for disengaging rotation when a door is open, control means for selectively varying the temperature within each section of the refrigerator and one of the doors incorporating a water filtration unit. Also shown are compressor 52 with a line 60 leading up through the center port 38, night light 22, water drip tray 54, rotation plate 28, base plate 56 and bearings 58.

I claim:

1. A rotating refrigerator, comprising:
    a) a cylindrically shaped housing hawing a plurality of compartments therein including refrigerator compartments and a freezer compartment, said housing having a base;
    b) wherein said housing is rotatably mounted on said base;
    c) a door being dispose on each said compartment located along an outer circumference of said housing;
    d) refrigeration coils mounted in a wall of said freezer compartment for cooling the air said freezer compartment,
    e) at least one fan for circulating the cooled air throughout each refrigeration compartment of said housing through walls separating said freezer compartment from said refrigeration compartment, a thermostat in each refrigerator compartment to control air temperature in each said refrigerator compartment by controlling said fan to permit the air temperature in each said refrigerator compartment to be regulated;

f) a rotation plate on a bottom portion of said housing above said base, a plurality of ball bearings being disposed between said rotation plate and said base to permit said housing to rotate about said base, g) compressor in said bottom portion of said housing, further comprising an access to said compressor through said housing, said compressor rotating with said housing on said base;

h) a vertically extending central port in said housing, said refrigeration and freezer compartments surrounding said port wherein said port is cylindrically shaped being disposed in said center of said housing extending from said bottom portion to said top portion of said housing, said port having means for conveying refrigerant from said compressor to said refrigeration coils;

i) a water drip tray adjacent said compressor between said compressor and an outer wall of said housing; and j) said base plate having an upper surface and said rotation plate having a lower surface with said bearings in between and said surfaces extending outwardly and downwardly from central portions of said base and rotation plates.

2. The refrigerator of claim 1, farther comprising a handle being disposed on each said door for opening said door and a control device for stopping rotation of said housing—when said door is opened.

3. The refrigerator of claim 2, further comprising a plurality of lights being disposed annularly around said bottom portion of said housing, wherein said lights are turned on when all doors are closed and are tuned off when a door is opened, said lights acting as a night light.

4. The refrigerator of claim 3, further comprising a water filtration unit being disposed on said door of said refrigerator to permit filtered water to be supplied to a user.

5. The refrigerator of claim 4, further comprising a plurality of shelves being disposed in each said compartment of said housing.

6. The refrigerator of claim 5, further comprising a plurality of drawers being disposed in each said compartment of said housing.

* * * * *